(12) United States Patent
Johnston et al.

(10) Patent No.: US 6,611,440 B1
(45) Date of Patent: Aug. 26, 2003

(54) APPARATUS AND METHOD FOR FILTERING VOLTAGE FOR AN ELECTROSTATIC PRECIPITATOR

(75) Inventors: David F. Johnston, Yorktown, VA (US); Michael M. Mahler, Hayes, VA (US); Terry L. Farmer, Kearney, MO (US); Robert Edgar Hummell, III, Newport News, VA (US)

(73) Assignee: BHA Group Holdings, Inc., Kansas City, MO (US)

( * ) Notice: Subject to any disclaimer, the term of this patent is extended or adjusted under 35 U.S.C. 154(b) by 0 days.

(21) Appl. No.: 10/063,099

(22) Filed: Mar. 19, 2002

(51) Int. Cl.[7] .............................. H02M 1/12; B03C 3/66
(52) U.S. Cl. .............................. 363/44; 323/903; 96/82; 95/81
(58) Field of Search .............................. 363/39, 44, 45, 363/46, 47, 131; 323/903; 96/80, 82; 95/80, 81

(56) References Cited

U.S. PATENT DOCUMENTS

| | | |
|---|---|---|
| 3,772,853 A | 11/1973 | Burge et al. |
| 4,052,177 A * | 10/1977 | Kide .............................. 96/82 X |
| 4,536,698 A | 8/1985 | Shevalenko et al. |
| 4,592,763 A | 6/1986 | Dietz et al. |
| 4,600,411 A | 7/1986 | Santamaria |
| 4,605,424 A | 8/1986 | Johnston |
| 4,680,532 A | 7/1987 | Itani et al. |
| 4,680,533 A | 7/1987 | Itani et al. |
| 4,802,063 A | 1/1989 | Carino |
| 5,068,811 A | 11/1991 | Johnston et al. |
| 5,512,315 A | 4/1996 | Hooper |
| 5,515,262 A | 5/1996 | Johnston |
| 5,629,842 A | 5/1997 | Johnson et al. |
| 5,705,923 A | 1/1998 | Johnston et al. |
| 5,903,450 A | 5/1999 | Johntson et al. |
| 5,972,076 A | 10/1999 | Nichols et al. |
| 6,063,168 A | 5/2000 | Nichols et al. |

OTHER PUBLICATIONS

Webpage: http://fitfibers.com/bicomponent_fibers.htm Fit-Fibers Bicomponent Fibers, (Jun. 13, 2002).
Webpage: http://www.capacitorindustries.com Capacitor Industries CH84 Very High– Voltage Capacitors in Plastic Tubes, (Jun. 13, 2002).
Royce Warnick, Martin Kirsten, Jerry Weiske, Russ Ridgeway Title: Advanced Switched Integrated Rectifiers for ESP Energization, pp. 1–8. (no date).
Harry J. White Title: Electrostatic Precipitation, pp. 223, 225. Reprinted by the International Society for Electrostatic Precipitation, 1963. (no month).
Jacob Katz, P.E. Title: The Art of Electrostatic Precipitation, p. 49 Precipitator Technology, Inc. Distributed by Scholium International, Inc. (no date).
Sir (Switched Integrated Rectifier) The Family of ESP Energizers ABB Environmental Systems Sweden. (no date).

* cited by examiner

Primary Examiner—Jessica Han
(74) Attorney, Agent, or Firm—Blackwell Sanders Peper Martin, LLP

(57) ABSTRACT

An apparatus and method for controlling voltage applied to an electrostatic precipitator is disclosed. This apparatus includes a pulsating, direct current, voltage mechanism that is operable to receive power from a single phase, alternating current voltage source, and a spiral wound filter capacitor, wherein the pulsating, direct current, voltage mechanism is electrically connected in parallel to the spiral wound filter capacitor and the spiral wound filter capacitor is electrically connected in parallel to the electrostatic precipitator. Optionally, a resistor is present to lower the transient voltage rating of the spiral wound filter capacitor. A switching mechanism may be utilized to apply differing amounts of capacitance and inductance in order to apply a range of voltage waveforms to the electrostatic precipitator to potentially maximize particulate collection efficiency for the electrostatic precipitator.

22 Claims, 4 Drawing Sheets

APPARATUS AND METHOD FOR FILTERING VOLTAGE FOR AN ELECTROSTATIC PRECIPITATOR

BACKGROUND OF INVENTION

This invention relates to voltage filters, and more particularly, to an apparatus and method for filtering voltage for an electrostatic precipitator.

Electrostatic precipitators fill an invaluable role in reducing air pollution. Primary sources of industrial air pollution include particulate matter from exhaust gases, the combustion of fossil fuels, and chemical processes. An electrostatic precipitator generates a strong electrical field that charges the particulate matter leaving an exhaust stack. These charged particles are then collected prior to leaving the exhaust stack to prevent these particles from polluting the atmosphere.

A conventional single-phase power supply for an electrostatic precipitator characteristically includes an alternating current voltage source of 380 to 600 volts with a frequency of either 50 or 60 Hertz. Typically, silicon-controlled rectifiers, which are controlled by an automatic voltage control device, are used to manage the power and modulate the time the alternating current line input flows to a transformer and a full wave, bridge rectifier. The full wave, bridge rectifier converts the alternating current voltage to a pulsating direct current voltage and doubles the output frequency to either 100 or 120 Hertz, respectively. This high voltage, direct current output is electrically connected to the electrostatic precipitator. There is a low pass filter in the form of a current limiting reactor electrically connected in series between the silicon-controlled rectifiers and the input to the transformer for limiting the high frequency energy and shaping the voltage waveform.

The electrostatic precipitator essentially operates as a capacitor with two conductors separated by an insulator. The conductors are the discharge electrodes and the collecting plates and the insulator is the exhaust gas that is being treated. The electrostatic precipitator essentially performs two functions. The first function is to operate as a load on the power supply so that corona current can be used to collect particles and the second function is to operate as a low pass filter. Since the capacitance of this low pass filter is of a relatively low value, the voltage waveform for the electrostatic precipitator has a significant amount of ripple voltage.

Sparking is a phenomenon that limits the electrical energization of the electrostatic precipitator. This is when the gas that is being treated in the exhaust stack has a localized breakdown so that there is a rapid rise in electrical current with an associated decrease in voltage. Therefore, instead of having the corona current distributed evenly across the entire field for the electrostatic precipitator, there is a high amplitude spark that funnels all of the available current in one path rather than an innumerable number of paths. This can cause damage to the internal components of the electrostatic precipitator as well as disrupt the entire operation of the electrostatic precipitator. The automatic voltage control device operates to interrupt power once a spark is sensed. The current limiting reactor then acts as a low pass filter to choke off the delivery of high frequency energy to the transformer. During this brief quench period, the current dissipates through this localized path of electrical conduction until the spark is extinguished and then the voltage is reapplied.

To improve particle collection efficiency for an electrostatic precipitator, the ripple voltage for the electrostatic precipitator is reduced. This is important since the presence of ripple voltage results in a peak value of the voltage waveform for the electrostatic precipitator that is greater than the average value of the voltage waveform for the electrostatic precipitator. Therefore, since the peak value of the voltage waveform for the electrostatic precipitator must not exceed the breakdown or sparking voltage level due to the problems described above, the average voltage that operates the electrostatic precipitator will be at a lower level. This lower level of average voltage will negatively affect the particle collection efficiency for the electrostatic precipitator.

One method of accomplishing this reduction in ripple voltage involves the complete replacement of the conventional, single-phase power supply with a three-phase, high frequency power supply. This three-phase, high frequency power supply is complex and very expensive, and there is a significant amount of down time when making this substitution. In addition, the three-phase, high frequency power supply typically emits an objectionable squeal from the magnetic components if this power supply is not operated at frequencies above that for human hearing. Operating at these high frequencies generates substantial amounts of heat so that oil pumps, heat exchangers and fans are typically required. Therefore, a failure of the cooling system results in a failure of the three-phase, high frequency power supply. The replacement of a single-phase power supply with a three-phase power supply is very cumbersome and costly since the entire system must be replaced including power cables and switch gear. Although this three-phase, high frequency power supply will provide virtually no ripple voltage and the minimum value, average value, and peak value of the precipitator voltage waveform will remain substantially the same, it is apparent that these previously described disadvantages are significant.

There are other methods of reducing ripple voltage applied to an electrostatic precipitator, such as having variable inductance for the current limiting reactor. However, this modification does not reduce the ripple voltage nearly enough the achieve the desired particulate collection efficiency since in addition to the significant presence of ripple voltage there is also variance between the minimum, average and peak values for the voltage waveform for the electrostatic precipitator.

Another method of reducing the ripple voltage applied to an electrostatic precipitator is to attach a T-type filter or π-type filter between the output of the full wave, bridge rectifier and the electrostatic precipitator field. A significant disadvantage to this system is all power supplied to the electrostatic precipitator must first flow through the T-type or π-type filter. This requires the discharge time constant for the filter to be long compared to the charge time constant for the electrostatic precipitator so that capacitance of the filter must be much larger than the capacitance of the electrostatic precipitator field. There is a well-known negative relationship with capacitance placed in parallel with the electrostatic precipitator. This relationship leads to powerful sparking that, as described previously, can paralyze the operation of the electrostatic precipitator as well as damage the electrostatic precipitator. When the capacitance of the filter is decreased to avoid this problem, then the collection efficiency of the electrostatic precipitator is considerably reduced.

The present invention is directed to overcoming one or more of the problems set forth above.

SUMMARY OF INVENTION

In one aspect of this invention, an apparatus for controlling voltage applied to an electrostatic precipitator is disclosed. This apparatus includes a pulsating, direct current, voltage mechanism that is operable to receive power from a single phase, alternating current voltage source. The apparatus also includes a spiral wound filter capacitor, wherein the pulsating, direct current, voltage mechanism is electrically connected in parallel to the spiral wound filter capacitor, and the spiral wound filter capacitor is electrically connected in parallel to the electrostatic precipitator.

In another aspect of this invention, a method for controlling voltage applied to an electrostatic precipitator is disclosed. This method includes connecting a spiral wound filter capacitor electrically in parallel with a pulsating, direct current voltage mechanism, which is operable to receive power from a single phase, alternating current voltage source. The spiral wound filter capacitor is also connected electrically in parallel with the electrostatic precipitator.

These are merely two illustrative aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings.

DETAILED DESCRIPTION

Figure 1:
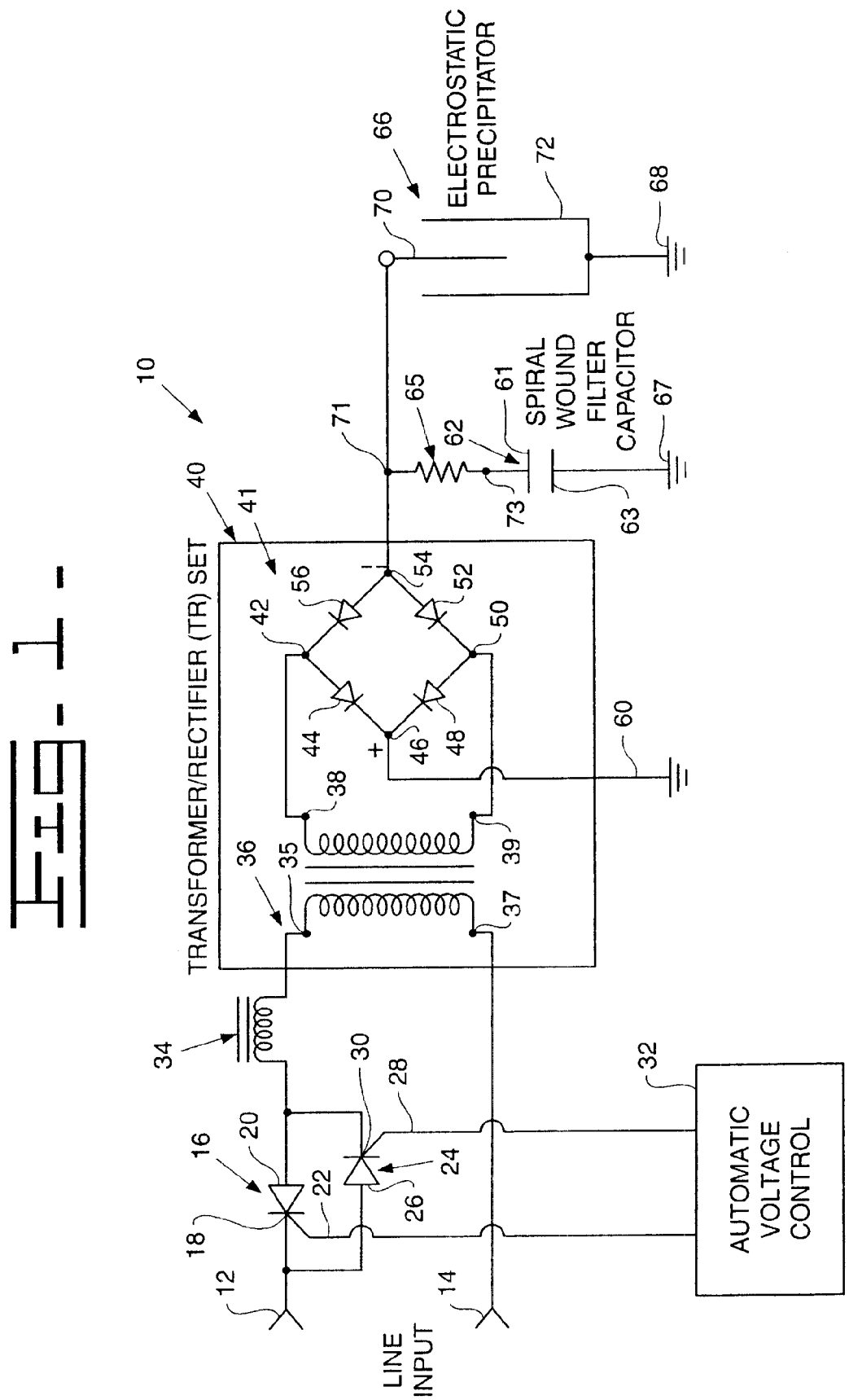
FIG. 1 is a schematic electrical diagram of a system of the present invention utilizing a spiral wound filter capacitor that optionally includes a resistor connected in series, where the combination of resistor and capacitor is electrically connected in parallel with an electrostatic precipitator.

Referring now to FIG. 1, a schematic circuit diagram of a system of the present invention for filtering voltage for an electrostatic precipitator is generally indicated by numeral 10. There is an alternating current, line input voltage that is applied to terminals 12 and 14, which is in the form of a sinusoidal waveform that goes between a negative value for one-half cycle and a positive value for one-half cycle with a value of zero volts between each half cycle. This alternating current line input voltage typically ranges from 380 to 600 volts and has a frequency of 50 or 60 Hertz. Therefore, at 50 Hertz, the half cycle is 10 milliseconds long and at 60 Hertz, the half cycle is 8.33 milliseconds long.

The first line input terminal 12 is electrically connected in series to a cathode 18 of a first silicon-controlled rectifier 16 and is also electrically connected in series to an anode 26 of a second silicon-controlled rectifier 24 in an inverse parallel relationship. Only one of the silicon-controlled rectifiers 16 and 24 conducts during any particular half cycle.

The gate 22 of the first silicon-controlled rectifier 16 and the gate 28 of the second silicon-controlled rectifier 24 are both electrically connected to an automatic voltage control device 32. This automatic voltage control device 32 can apply a positive voltage to either gate 22 or gate 28 of the first and second silicon-controlled rectifiers 16 and 24, respectively, to initiate an avalanche to allow either the positive or negative portion of the alternating current cycle to flow from either the anode 20 of the first silicon-controlled rectifier 16 or the cathode 30 of the second silicon-controlled rectifier 24, respectively. This allows the silicon-controlled rectifiers 16 and 24 to turn on at the same voltage level during a half cycle and remain turned on until the current through the silicon-controlled rectifier 16 or the silicon-controlled rectifier 24 falls below a predetermined level.

The automatic voltage control device 32 is used for power control and to regulate the amount of time that the alternating current, voltage line that is electrically connected to terminal 12 is conducting. In addition, when a spark occurs, the automatic voltage control device 32 can stop providing the avalanche voltage to the gates 22 and 28 of the silicon-controlled rectifiers 16 and 24, respectively, to allow the spark to extinguish. A representative automatic voltage control device 32 is disclosed in U.S. Pat. No. 5,705,923, which issued to Johnston et al. on Jan. 6, 1998 and is assigned to BHA Group, Inc. and entitled Variable Inductance Current Limiting Reactor Control System for Electrostatic Precipitator, which is incorporated herein by reference.

The anode 20 of the first silicon-controlled rectifier 16 and the cathode 30 of the second silicon-controlled rectifier 24 are electrically connected in series to a current limiting reactor 34. The current limiting reactor 34 filters and shapes the voltage waveform leaving the first silicon-controlled rectifier 16 and the second silicon-controlled rectifier 24. Ideally, the shape of the voltage waveform leaving the current limiting reactor 34 will be broad since the average value produces work. Such a voltage waveform yields the best collection efficiency for an electrostatic precipitator 66. Ideally, the peak and average values of the voltage signal entering the electrostatic precipitator 66 will be very close. Moreover, maximum power transfer is attained when the load impedance matches the line impedance. Therefore, the current limiting reactor 34 is preferably set so that the inductance of the current limiting reactor 34 matches the total circuit impedance including the load of the electrostatic precipitator 66. This is accomplished by measuring the form factor and then selecting a particular tap from a selection of taps (not shown) on the current limiting reactor 34 that most closely matches the desired inductance value.

There is a transformer rectifier set that is generally indicated by numeral 40. A representative transformer rectifier set 40 is disclosed in U.S. Pat. No. 5,068,811, which issued to Johnston et al. on Nov. 26, 1991 and is assigned to BHA Group, Inc. and entitled Electrical Control System for Electrostatic Precipitator, which is incorporated herein by reference.

The transformer rectifier set 40 includes a transformer 36 and a full wave rectifier, e.g., bridge, which is generally indicated by numeral 41. The output of the current limiting reactor 34 is electrically connected to a first input 35 for the transformer 36 and the alternating current line input voltage from terminal 14 is electrically connected to a second input 37 for the transformer 36.

The first output 38 for the transformer 36 is electrically connected to a first input 42 for the full wave rectifier 41 and the second output 39 for the transformer 36 is electrically connected to a second input 50 for the full wave rectifier 41. The first input 42 for the full wave rectifier 41 is electrically connected to an anode for a first diode 44 and to a cathode for a fourth diode 56 and the second input 50 to the full wave rectifier 41 is electrically connected to an anode for a second diode 48 and to a cathode for a third diode 52. The first output 46 for the full wave rectifier 41 is electrically connected to a cathode for the first diode 44 and to a cathode for the second diode 48. In addition, this first output 46 is electrically connected to ground 60.

The second output 54 for the full wave rectifier 41 is electrically connected to an anode for the fourth diode 56 and to an anode for the third diode 52. In addition, the second output 54 is preferably electrically connected to a first electrical connection 71 for a resistor 65 and a second electrical connection 73 for the resistor 65 is electrically connected in series to a first electrode 61 for a spiral wound filter capacitor 62. The second electrode 63 for the spiral wound filter capacitor 62 is also electrically connected to ground 67. The first electrical connection 71 for the resistor 65 is also electrically connected to a plurality of corona electrodes 70 located with the plurality of collector electrodes 72 associated with the electrostatic precipitator 66. The plurality of collector electrodes 72 are electrically connected to ground 68. The spiral wound filter capacitor 62 preferably has a value of capacitance that is a multiple of the capacitance for the electrostatic precipitator 66.

Although the use of the resistor 65 that is electrically connected in series with the spiral wound filter capacitor 62 is preferred, it is optional. The resistor 65 serves to dampen transients created when a spark occurs in the electrostatic precipitator 66. The rate of change of current, in contrast to the magnitude of the current, is the factor that induces the voltage. This is provided by the equation where $E = -L * (di/dt)$, where E is the induced voltage, L is the inductance and di/dt is the rate of change of current through the inductor with respect to time. The negative sign indicates that the induced voltage opposes the source of the voltage that created the induced voltage. Therefore, even though the magnitude for the current is not sufficient to cause damage to the electrostatic precipitator 66, the high rate of change of current in conjunction with the internal inductance of the spiral wound filter capacitor 62 can create a high transient voltage across the spiral wound filter capacitor 62. This directly affects the voltage rating required for the spiral wound filter capacitor 62. The size and expense of the spiral wound filter capacitor 62 increases dramatically when the voltage rating for the spiral wound filter capacitor 62 is significantly increased. The inclusion of this resistor 65 reduces di/dt, which reduces the required voltage rating and size of the spiral wound filter capacitor 62.

The capacitance of the spiral wound filter capacitor 62 is preferably over 0.1 microfarads. The preferred value of resistance for the resistor 65 is preferably less than 10,000 ohms and more preferably less than 1,000 ohms.

The spiral wound filter capacitor 62 can be utilized with both new and existing single-phase electrostatic precipitator power supplies. This spiral wound filter capacitor 62 can provide nearly zero ripple voltage with the minimum value, average value, and peak value of the voltage waveform for the electrostatic precipitator 66 being substantially the same. As stated previously, one would not connect a standard capacitor in parallel with the electrostatic precipitator 66 due to the potentially damaging spark currents that are created. The use of a spiral wound filter capacitor 62 provides the desired filtering without increasing the amplitude of spark currents or requiring the addition of other expensive components that require maintenance.

Although a wide variety of spiral wound filter capacitors will suffice for the present invention, the preferred type of spiral wound filter capacitor 62 is a Model CH84 manufactured by Capacitor Industries, having a place of business at 6455 N. Avondale Ave., Chicago, Ill. 60631. The rated voltage can vary depending on the type of electrostatic precipitator 66 that is utilized. This typically requires a rating of over 40,000 volts. The operating temperature of the spiral wound filter capacitor 62 is between 40 degrees Celsius (−40 degrees Fahrenheit) to 70 degrees Celsius (158 degrees Fahrenheit). The insulation resistance for the spiral wound filter capacitor 62 is rated at over 200,000 Megaohms at 20 Degrees Celsius (68 degrees Fahrenheit) at 500 volts of direct current.

In addition, although a wide variety of resistors will suffice for the present invention, the preferred type of resistor 65 is a Model L225J500 manufactured by Ohmite® Mfg. Co., having a place of business at 3601 Howard Street, Skokie, Ill. 60076. In one nonlimiting and illustrative example, since one Ohmite® Model L225J500 resistor is rated at 500 ohms and 225 watts, then when two Ohmite® Model L225J500 resistors are electrically connected in parallel, then 250 ohms of resistance that can withstand 450 watts of applied power is the result. The rated voltage and power can vary depending on the type of electrostatic precipitator 66 that is utilized.

Figure 2:
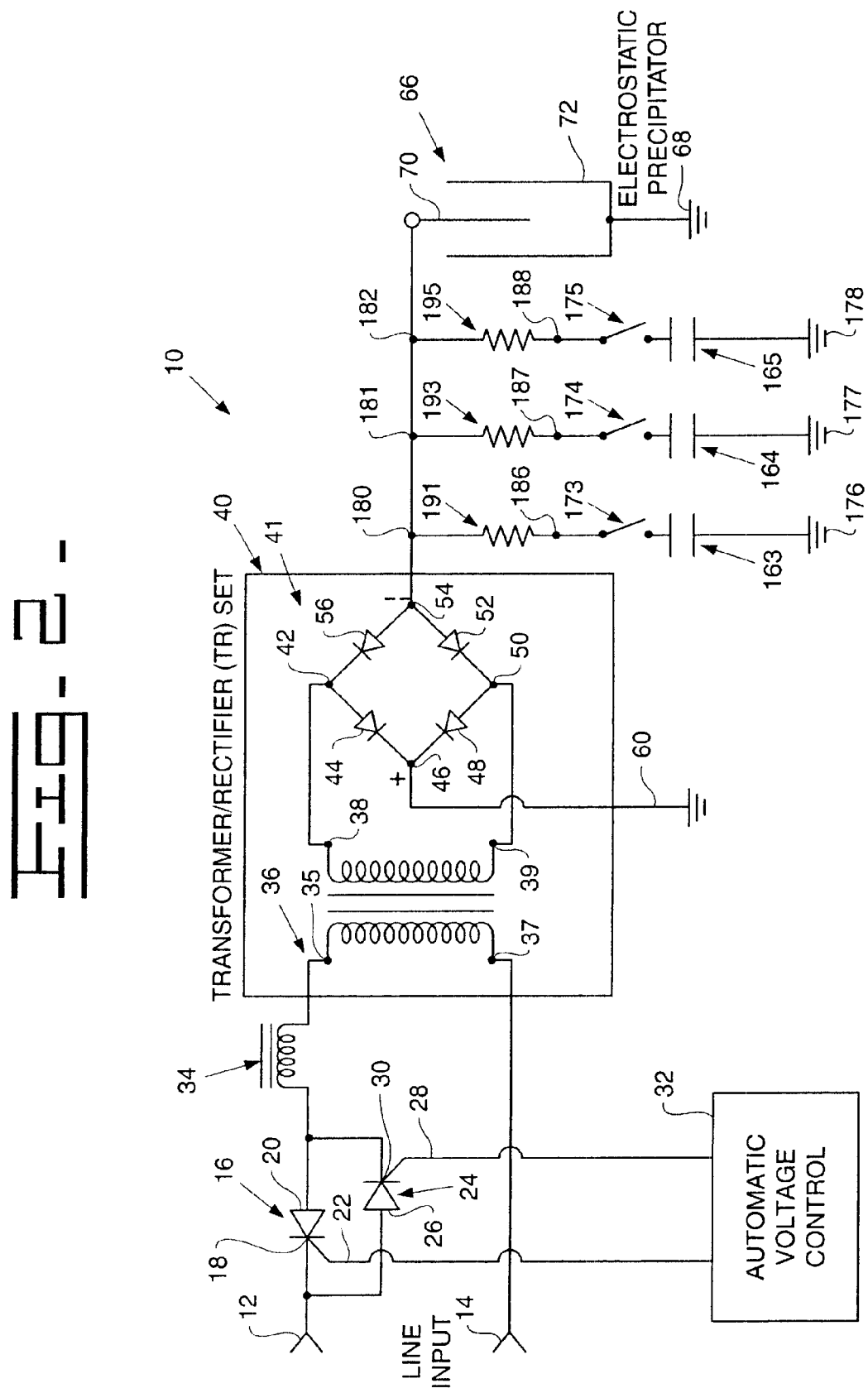
FIG. 2 is a schematic electrical diagram of a system of an alternative embodiment of the present invention utilizing three (3) combinations of a switching mechanism LabelAddresseel connected electrically in seriesLabelAddresseel with a spiral wound filter capacitor as well as an optional resistor, wherein each combination of switching mechanism, spiral wound filter capacitor and resistor is electrically connected in parallel with an electrostatic precipitator.

Referring now to FIG. 2, which is identical to FIG. 1, with the sole exception that instead of a single spiral wound filter capacitor 62 that is electrically connected in series with an optional single resistor 65, there is a plurality of combinations of spiral wound filter capacitors 163, 164 and 165 and corresponding resistors 191, 193 and 195, that are each electrically connected in a series relationship and are capable of being switched in and out of the circuit by a series of switching mechanisms 173, 174 and 175. These switching mechanisms 173, 174 and 175 are also connected electrically in series to the spiral wound filter capacitors 163, 164 and 165 and corresponding resistors 191, 193 and 195, respectively, in a one-to-one correspondence.

In the preferred embodiment, one end of each of the spiral wound filter capacitors 163, 164 and 165 is electrically connected to ground at points 176, 177 and 178, respectively and the other end of each of the spiral wound filter capacitors 163, 164 and 165 is electrically connected to one end of each of the switching mechanisms 173, 174 and 175. The other end of each of the switching mechanisms 173, 174 and 175 is electrically connected in series to first electrical connections 186, 187 and 188, respectively, for each of the resistors 191, 193 and 195. The second electrical connections 180, 181 and 182 for the resistors 191, 193 and 195, respectively, are electrically connected to the second output 54 for the full wave rectifier 41 and the plurality of corona electrodes 70 associated with the electrostatic precipitator 66.

These switching mechanisms 173, 174 and 175 are preferably in the form of single pole, single throw switches, however a wide variety of switching mechanisms may suffice. For example, the switching devices 173, 174 and 175 may be in the form of a solid state device (not shown), which is electrically connected to a processor (not shown) so that varying amounts of capacitance and inductance can be switched in and out of the circuit at predetermined time periods or in response to sensed input. The switching mechanisms 173, 174 and 175 allow for the testing of the effectiveness of the voltage filtering circuit 10 with regard to particulate collection efficiency of the electrostatic precipitator 66. Moreover, the greater the number of switching mechanisms, the greater the range of voltage waveforms that can be achieved and applied to the electrostatic precipitator 66.

Figure 3:
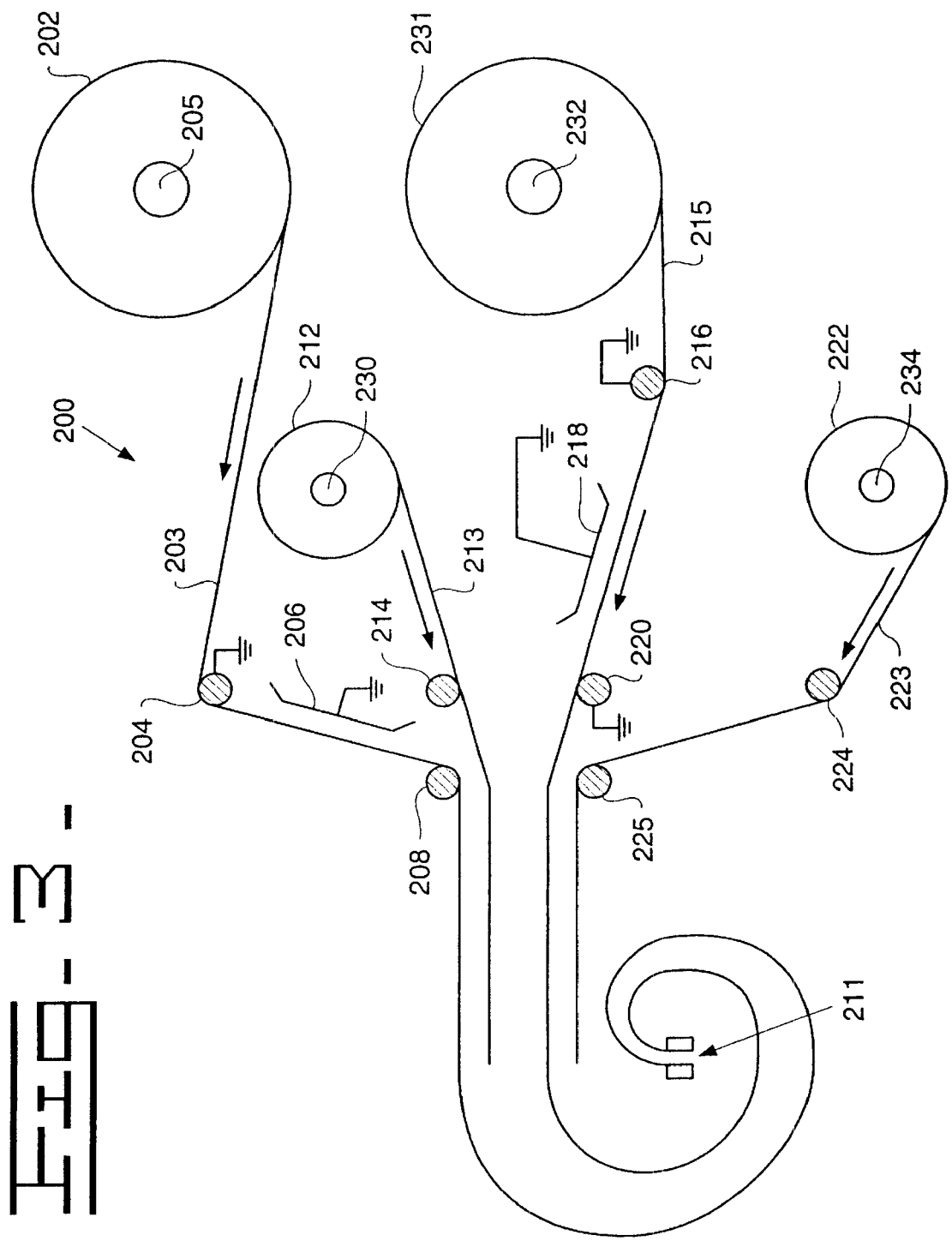
FIG. 3 is a side elevational view of a process for creating spiral wound filter capacitors with multiple insulating layers and conductive layers.

Referring now to FIG. 3, a general schematic of the components associated with the spiral wound filter capacitor 62 is generally indicated by numeral 200. There is a first insulating layer 203 that can include a roll of dielectric film 202 mounted on a first cylinder 205. This first insulating layer 203 is preferably, but not necessarily, made of polyester and polypropylene. This first insulating layer 203 passes over a first grounded roller 204, a first grounded tensioning plate 206, a second grounded roller 208 and then wraps around a core 211. The core 211 is preferably, but not necessarily, made of phenolic material. Positioned underneath this first insulating layer 203 is a first conductive layer 213 that can include a roll of metallic film 212 mounted on a second cylinder 230. This first conductive layer 213 is preferably, but not necessarily, made of aluminum foil. This first conductive layer 213 passes over a third grounded roller 214 and then wraps around the core 211. Positioned underneath this first conductive layer 213 is a second insulating layer 215 that can include a roll of insulating dielectric film 231 mounted on a third cylinder 232. This second insulating layer 215 is preferably, but not necessarily, made of polyester and polypropylene. This second insulating layer 215 passes over a fourth grounded roller 216, a second grounded tensioning plate 218, a fifth grounded roller 220 and then wraps around the core 211. Positioned underneath this second insulating layer 215 is a second conductive layer 223 that can include a roll of metallic film 222 mounted on a fourth cylinder 234. This second conductive layer 223 is preferably, but not necessarily, made of aluminum foil. This second conductive layer 223 passes over a sixth grounded roller 224 and a seventh grounded roller 225 and then wraps around the core 211.

Referring additionally to FIG. 1, the thickness and width of the first and second insulating layers 203 and 215, respectively, and the thickness and width of the first and second conductive layers 213 and 223, respectively, depend on the desired capacitance value and voltage rating. The greater the number of turns around the core 211 of both the first and second insulating layers 203, 215 and the first and second conductive layers 213, 223, the greater the value of capacitance. Due to the series windings of first and second conductive layers 213 and 223, respectively, which are similar to winding a coil, a substantial internal inductance is also present in the spiral wound filter capacitor 62. The inductive reactance provides opposition to the alternating current that is directly proportional to frequency. Therefore, when the frequency increases, so does the amount of inductive reactance so that the spiral wound filter capacitor 62 is frequency dependent. This means that the spiral wound filter capacitor 62, when charged, will provide low frequency current to the electrostatic precipitator 66 but will not provide high frequency current to the electrostatic precipitator 66. Since the spiral wound filter capacitor 62 is electrically connected in parallel to the plurality of corona electrodes 70 for the electrostatic precipitator 66, the low frequency corona current is provided while limiting the high frequency current created by sparking. This is an advantage over the prior art since there is little or no attenuation of the normal corona current. This spiral wound filter capacitor 62 can be easily adapted to existing or new voltage systems for electrostatic precipitators 66.

Figure 4:
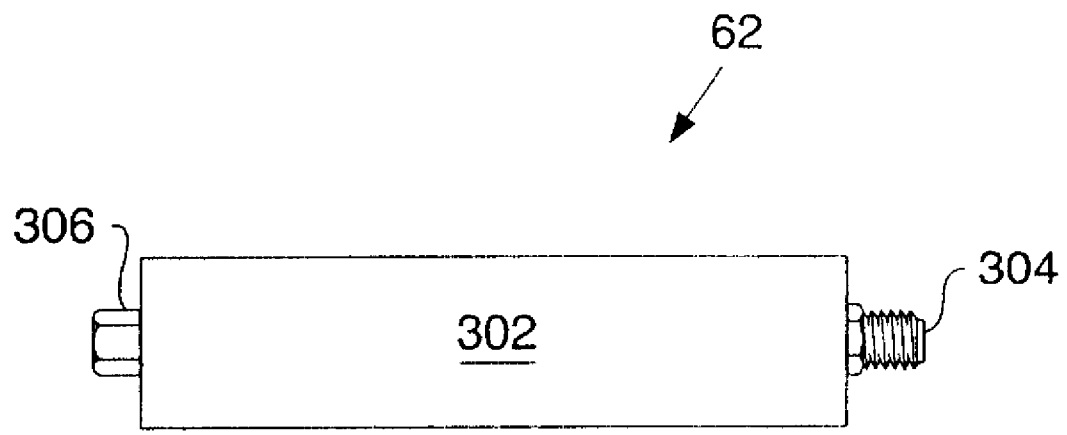
FIG. 4 is a perspective view of a spiral wound filter capacitor utilized with the present invention including a casing and electrodes.

Referring now to FIG. 4 in addition to FIG. 3, the spiral wound filter capacitor is generally indicated by numeral 62. The previously described first insulating layer 203, first conductive layer 213, second insulating layer 215 and second conductive layer 223 are wound within a casing 302 and preferably impregnated and sealed with an epoxy filling. The casing 302 is preferably, but not necessarily, formed of hard plastic material. There can be a male screw terminal 304 and electrically connected to the first conductive layer 213 to form the first electrode 61, shown in FIG. 1. Also as shown in FIG. 4, there is also a female terminal 306 electrically connected to the second conductive layer 223, to form the second electrode 63, shown in FIG. 1.

Therefore, use of at least one spiral wound filter capacitor 62 in parallel to an electrostatic precipitator 66 provides a filter to reduce voltage ripple and reshape the voltage waveform for the electrostatic precipitator 66, so that the minimum value, average value and peak value are substantially the same utilizing a conventional, single phase power supply. This one spiral wound filter capacitor 62 provides the advantage of decreasing potentially damaging spark currents or attenuating normal corona current.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. An apparatus for controlling voltage applied to an electrostatic precipitator comprising:
   a pulsating, direct current, voltage mechanism that is operable to receive power from a single phase, alternating current voltage source; and
   a spiral wound filter capacitor, wherein the pulsating, direct current, voltage mechanism is electrically connected in parallel to the spiral wound filter capacitor and the spiral wound filter capacitor is operable to be electrically connected in parallel to the electrostatic precipitator.

2. The apparatus according to claim 1, wherein the spiral wound filter capacitor has a value of capacitance that is greater than 0.1 microfarad.

3. The apparatus according to claim 1, wherein the spiral wound filter capacitor includes a core surrounded by at least one insulating layer and at least one conductive layer.

4. The apparatus according to claim 3, wherein the core includes phenolic material, the at least one conductive layer includes a metallic film and the at least one insulating layer includes a dielectric film.

5. The apparatus according to claim 1, wherein the pulsating, direct current, voltage mechanism includes a transformer, having a first input, a second input, a first output and a second output, wherein the first input of the transformer is electrically connected in series to a first inlet that is operable to receive an alternating current input voltage and the second input of the transformer is electrically connected in series to a second inlet that is operable to receive the alternating current input voltage and a full wave rectifier, having a first input, a second input, a first output and a second output, wherein the first input of the full wave rectifier is electrically connected to the first output of the transformer and the second input of the full wave rectifier is electrically connected to the second output of the transformer, wherein the spiral wound filter capacitor includes a first electrode and a second electrode, wherein the first electrode of the spiral wound filter capacitor is electrically connected to the first output of the full wave rectifier and the second electrode of the spiral wound filter capacitor is electrically connected to the second output of the full wave rectifier.

6. The apparatus according to claim 5, wherein the pulsating, direct current voltage mechanism includes at least one voltage control mechanism, having an input and an output, wherein the input of the at least one voltage control mechanism is electrically connected to a first inlet that is operable to receive an alternating current, input voltage and further includes a current limiting reactor, having an input and an output, wherein the input of the current limiting reactor is electrically connected in series to the output of the voltage control mechanism, wherein the first input of the transformer is electrically connected in series to the output of the current limiting reactor and the second input of the transformer is electrically connected in series to a second inlet that is operable to receive the alternating current, input voltage.

7. The apparatus according to claim 6, wherein the voltage control mechanism includes at least one silicon-controlled rectifier and an automatic voltage control device.

8. The apparatus according to claim 1, wherein the spiral wound filter capacitor is electrically connected in series to a resistor, wherein the pulsating, direct current, voltage mechanism is electrically connected in parallel to a combination of the spiral wound filter capacitor and the resistor, wherein the combination of the spiral wound filter capacitor and the resistor is operable to be electrically connected in parallel to the electrostatic precipitator.

9. The apparatus according to claim 8, wherein the resistor has a value of resistance that is less than 10,000 ohms.

10. An apparatus for controlling voltage applied to an electrostatic precipitator comprising:
 a pulsating, direct current voltage mechanism that is operable to receive power from a single phase, alternating current voltage source; and
 at least one combination of switching mechanism that is electrically connected in series with a spiral wound filter capacitor, wherein the at least one combination of switching mechanism and spiral wound filter capacitor is electrically connected in parallel to the pulsating, direct current voltage mechanism and the at least one combination of switching mechanism and spiral wound filter capacitor is operable to be electrically connected in parallel to the electrostatic precipitator.

11. The apparatus according to claim 10, wherein each spiral wound filter capacitor of the at least one combination of switching mechanism and spiral wound filter capacitor has a value of capacitance that is greater than 0.1 microfarad.

12. The apparatus according to claim 11, wherein each spiral wound filter capacitor of the at least one combination of switching mechanism and spiral wound filter capacitor includes a core surrounded by at least one insulating layer and at least one conductive layer.

13. The apparatus according to claim 12, wherein the at least one conductive layer includes a metallic film and the at least one insulating layer includes a dielectric film.

14. The apparatus according to claim 10, wherein at least one combination of switching mechanism that is electrically connected in series with a spiral wound filter capacitor further includes a resistor electrically connected in series with the switching mechanism and the spiral wound filter capacitor.

15. An apparatus for controlling voltage applied to an electrostatic precipitator comprising:
 a voltage control mechanism, having an input and an output, wherein the input of the voltage control mechanism is electrically connected to a first inlet that is operable to receive an alternating current input voltage, wherein the voltage control mechanism includes at least one silicon-controlled rectifier having a gate that is electrically connected to an automatic voltage control device;
 a current limiting reactor, having an input and an output, wherein the input of the at least one current limiting reactor is electrically connected in series to the output of the voltage control mechanism;
 a transformer, having a first input, a second input, a first output and a second output, wherein the first input of the transformer is electrically connected in series to the output of the current limiting reactor and the second input of the transformer is electrically connected in series to a second inlet that is operable to receive the alternating current input voltage;
 a full wave rectifier, having a first input, a second input, a first output and a second output, wherein the first input of the full wave rectifier is electrically connected to the first output of the transformer and the second input of the full wave rectifier is electrically connected to the second output of the transformer; and
 a spiral wound filter capacitor, having a first electrode and a second electrode, wherein the first electrode of the spiral wound filter capacitor is electrically connected to the first output of the full wave rectifier and the second electrode of the spiral wound filter capacitor is electrically connected to the second output of the full wave rectifier, wherein the spiral wound filter capacitor is electrically connected in parallel to the electrostatic precipitator.

16. A method for controlling voltage applied to an electrostatic precipitator comprising:
 connecting a spiral wound filter capacitor electrically in parallel with a pulsating, direct current voltage mechanism, which is operable to receive power from a single phase, alternating current voltage source; and
 connecting the spiral wound filter capacitor electrically in parallel with the electrostatic precipitator.

17. The method according to claim 16, wherein the spiral wound filter capacitor has a value of capacitance that is greater than 0.1 microfarad.

18. The method according to claim 16, wherein the spiral wound filter capacitor includes a core surrounded by at least one insulating layer and at least one conductive layer.

19. The method according to claim 16, further includes electrically connecting a resistor in series to the spiral wound filter capacitor and then electrically connecting a combination of the spiral wound filter capacitor and the resistor in parallel with the pulsating, direct current voltage mechanism and in parallel with the electrostatic precipitator.

20. A method for controlling voltage applied to an electrostatic precipitator comprising:
 connecting electrically in series at least one combination of a switching mechanism to a spiral wound filter capacitor;
 connecting electrically the at least one combination of switching mechanism and spiral wound filter capacitor in parallel to a pulsating, direct current voltage mechanism; and
 connecting electrically the at least one combination of switching mechanism and spiral wound filter capacitor in parallel to the electrostatic precipitator.

21. The method according to claim 20, further includes:

electrically connecting a resistor in series to the spiral wound filter capacitor and the switching mechanism;

electrically connecting the combination of spiral wound filter capacitor, switching mechanism and resistor in parallel with the pulsating, direct current voltage mechanism; and electrically connecting the combination of spiral wound filter capacitor, switching mechanism and resistor in parallel with the electrostatic precipitator.

22. The apparatus according to claim 21, wherein the spiral wound filter capacitor has a value of capacitance that is greater than 0.1 microfarad.

* * * * *